United States Patent
Bendak et al.

(10) Patent No.: US 6,836,485 B1
(45) Date of Patent: Dec. 28, 2004

(54) SYSTEM AND METHOD FOR PROGRAMMING LOSS OF SYNCHRONIZATION IN A MULTIDIMENSIONAL DIGITAL FRAME STRUCTURE

(75) Inventors: George Beshara Bendak, San Diego, CA (US); Alan Michael Sorgi, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 707 days.

(21) Appl. No.: 09/747,072

(22) Filed: Dec. 22, 2000

(51) Int. Cl.[7] .................................................. H04L 7/00
(52) U.S. Cl. ......................................... 370/509; 370/503
(58) Field of Search .............................. 370/503, 506, 370/509, 511, 513, 514

(56) References Cited

U.S. PATENT DOCUMENTS

| | | |
|---|---|---|
| 5,251,205 A | 10/1993 | Callon et al. |
| 5,490,252 A | 2/1996 | Macera et al. |
| 5,568,471 A | 10/1996 | Hershey et al. |
| 5,661,763 A | 8/1997 | Sands |
| 5,666,108 A | 9/1997 | Duffy |
| 5,778,000 A | 7/1998 | Dosiere et al. |
| 5,793,976 A | 8/1998 | Chen et al. |
| 5,854,699 A | 12/1998 | Olshansky |
| 5,875,396 A | 2/1999 | Stockton et al. |
| 5,982,743 A | 11/1999 | Kusano |
| 6,006,069 A | 12/1999 | Langston |
| 6,161,203 A * | 12/2000 | Zuranski et al. ............. 714/707 |
| 6,731,640 B1 * | 5/2004 | Perry et al. ............... 370/395.6 |

\* cited by examiner

*Primary Examiner*—Kenneth Vanderpuye
(74) *Attorney, Agent, or Firm*—Incaplaw; Terrance A. Meador

(57) ABSTRACT

A system and method have been provided for programming synchronization features of a multidimensional digital frame structure. Such a frame structure acts as a digital wrapper and includes overhead, payload, and forward error correction (FEC) sections. Words in the overhead section are used to synchronize the frame structure. The described invention programs the number of frames, with non-recognizable frame synchronization bytes (FSBs), required for the communication link to fall out of synchronization, so that the system and method are flexible for changes in communication protocols. This flexibility also impacts the number, value, location, bandwidth, and the bit error rate (BER) of the located FSBs.

42 Claims, 4 Drawing Sheets

US 6,836,485 B1

SYSTEM AND METHOD FOR PROGRAMMING LOSS OF SYNCHRONIZATION IN A MULTIDIMENSIONAL DIGITAL FRAME STRUCTURE

RELATED APPLICATIONS

This application contains material related to the following commonly assigned copending U.S. Patent Applications incorporated herein by reference:

Ser. No. 08/746,490 filed 22 Dec. 2000 for "SYSTEM AND METHOD FOR PROGRAMMING THE LOCATION OF FRAME SYNCHRONIZATION WORDS IN A MULTIDIMENSIONAL DIGITAL FRAME STRUCTURE"

Ser. No. 09/745,655 filed 22 Dec. 2000 for "SYSTEM AND METHOD FOR PROGRAMMING THE VALUE OF FRAME SYNCHRONIZATION WORDS IN A MULTIDIMENSIONAL DIGITAL FRAME STRUCTURE"

Ser. No. 09/747,380 filed 22 Dec. 2000 for "SYSTEM AND METHOD FOR PROGRAMMING THE BIT ERROR RATE OF FRAME SYNCHRONIZATION WORDS IN A MULTIDIMENSIONAL DIGITAL FRAME STRUCTURE"

Ser. No. 09/746,152 filed 22 Dec. 2000 for "SYSTEM AND METHOD FOR PROGRAMMING THE QUANTITY OF FRAME SYNCHRONIZATION WORDS IN A MULTIDIMENSIONAL DIGITAL FRAME STRUCTURE"

Ser. No. 09/745,793 filed 22 Dec. 2000 for "SYSTEM AND METHOD FOR SELECTIVELY BROADCASTING A MULTIDIMENSIONAL DIGITAL FRAME STRUCTURE"

Ser. No. 09/745,794 filed 22 Dec. 2000 for "SYSTEM AND METHOD FOR PROGRAMMING SYNCHRONIZATION CRITERIA IN A MULTIDIMENSIONAL DIGITAL FRAME STRUCTURE"

Ser. No. 09/746,159 filed 22 Dec. 2000 for "SYSTEM AND METHOD FOR TRANSLATING OVERHEAD BYTES IN A MULTIDIMENSIONAL DIGITAL FRAME STRUCTURE"

Ser. No. 09/527,343, filed 17 Mar. 2000 for "TRANSPOSABLE FRAME SYNCHRONIZATION STRUCTURE"

Ser. No. 09/528,021, filed 17 Mar. 2000 for "PROGRAMMABLE SYNCHRONIZATION STRUCTURE WITH AUXILIARY DATA LINK"

BACKGROUND OF THE INVENTION

1. Field of the Invention

This invention generally relates to information communicated in a digital wrapper and, more particularly, to a system and method for programming the criteria by which the loss of frame synchronization in a digitally wrapped-communication is defined.

2. Description of the Related Art

Frame synchronization is used in most communication technologies where extra bandwidth is required to add functionality into the original data stream. There is no standard practice with respect to the bandwidth allocation for frame synchronization words. Neither is there an ability to customize the use of that bandwidth and synchronization thresholding to adapt to various bit error rate conditions in a variable rate forward error correction (FEC) system implementing an interleaved multi-frame superframe.

It would increase information bandwidth if all the bytes, or words of a digital frame structure could be devoted to payload. However a significant portion of the frame is devoted to FEC to remove errors that are introduced in data transmission lines. Even fiber optic systems can be noisy enough to introduce errors, when the distance between nodes is great enough. In addition, part of the frame must be used for maintenance functions between communication nodes. Further, a portion of the frame must be devoted to synchronization. The synchronization function becomes even more critical when the frames are scrambled to randomize the data density. These maintenance and synchronization bytes reside in the overhead section of the frame. However, as mentioned above, there is no standard protocol defining the number, location, or value of frame synchronization bytes. Hardware devoted to any particular protocol or implementation quickly becomes obsolete. An exclusively software approach to managing communications is cumbersome It would be advantageous if communication hardware could be developed that permitted flexibility in defining the frame synchronization byte structure, so as to permit the hardware to be used in a number of communication standards.

It would be advantageous if the number of frames with non-recognizable frame synchronization bytes (FSBs), required for synchronization to lapse could be made selectable in a multidimensional digital frame structure.

Likewise, it would be advantageous if the number, location, values, and bit error rates of the FSBs could be made selectable to accommodate a number of communication standards, or changes to existing standards.

SUMMARY OF THE INVENTION

Accordingly, an integrated circuit communication device is provided that includes programmable features that permit a user to allocate bandwidth for frame synchronization words, and set up error thresholding in adjusting the robustness to bit errors, and the time required to achieve synchronization. More specifically, the device provides for:

a programmable frame synchronization word bandwidth;

programmable frame synchronization words;

different synchronization words with independent allocated bandwidths;

frame synchronization word translation between the decoder and encoder;

frame synchronization word error thresholding for system robustness;

programmable synchronization (in-to-sync) parameters; and programmable out-of-sync synchronization parameters.

Broadly, this invention describes a structure for programming key features in a frame synchronization system using a multidimensional digital frame. More particularly, an example of the invention is provided in a programmable framing structure for a forward error correction (FEC) encoded channel interleaved to 16 levels with a 4 frame superframe. The structure provides the user the ability to allocate the amount of bandwidth dedicated to the frame synchronization words, to control the speed of synchronization and the robustness to channel noise. As an added benefit, a programmable synchronization threshold can be set to even further increase the robustness to channel noise and to decrease the synchronization time under high bit error rate conditions. These techniques together allow users to increase network security and partitioning as well as to dynamically reallocate the bandwidth occupied for framing based on link conditions without corrupting user data.

Details of the programmable communication IC and a method for variably programming the frame synchronization structure in a multidimensional digital frame structure are provided below.

DESCRIPTION OF THE PREFERRED EMBODIMENTS

Figure 1:
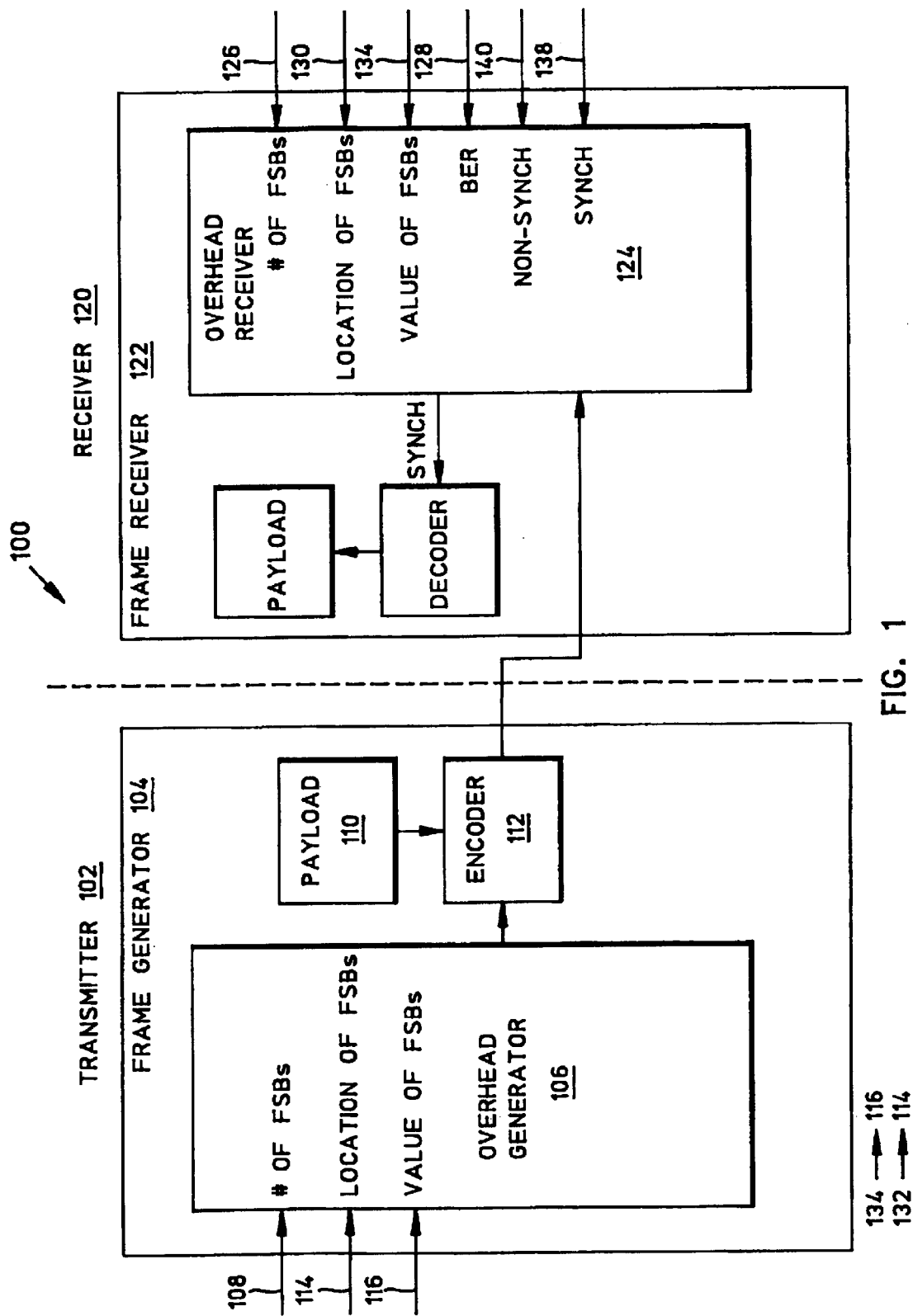
FIG. 1 is a schematic block diagram of a system for variably programming frame synchronization loss criteria in the communication of a multidimensional digital frame structure.

FIG. 1 is a schematic block diagram of a system for variably programming frame synchronization loss criteria in the communication of a multidimensional digital frame structure. The system 100 comprises a transmitter 102 with a frame generator 104. The frame generator 104 includes an overhead generator 106 having an input to accept commands on line 108 for selecting the number of synchronization bytes in the overhead section of a frame. A payload generator 110 supplies the information that is to be transmitted. The information can be generated at the transmitter 102, or it can be the payload of a previously received frame. In this case, the transmitter 102 acts as a relay. The frame generator 104 also includes an FEC section, or encoder 112. The encoder codes the payload so that errors due to degradation can be removed at the destination. In some aspects of the invention, parts of the overhead section, or the entire overhead section is encoded, along with the payload. Commands to select FSB locations are accepted on line 114, and commands to select FSB values are accepted on line 116.

Figure 2:
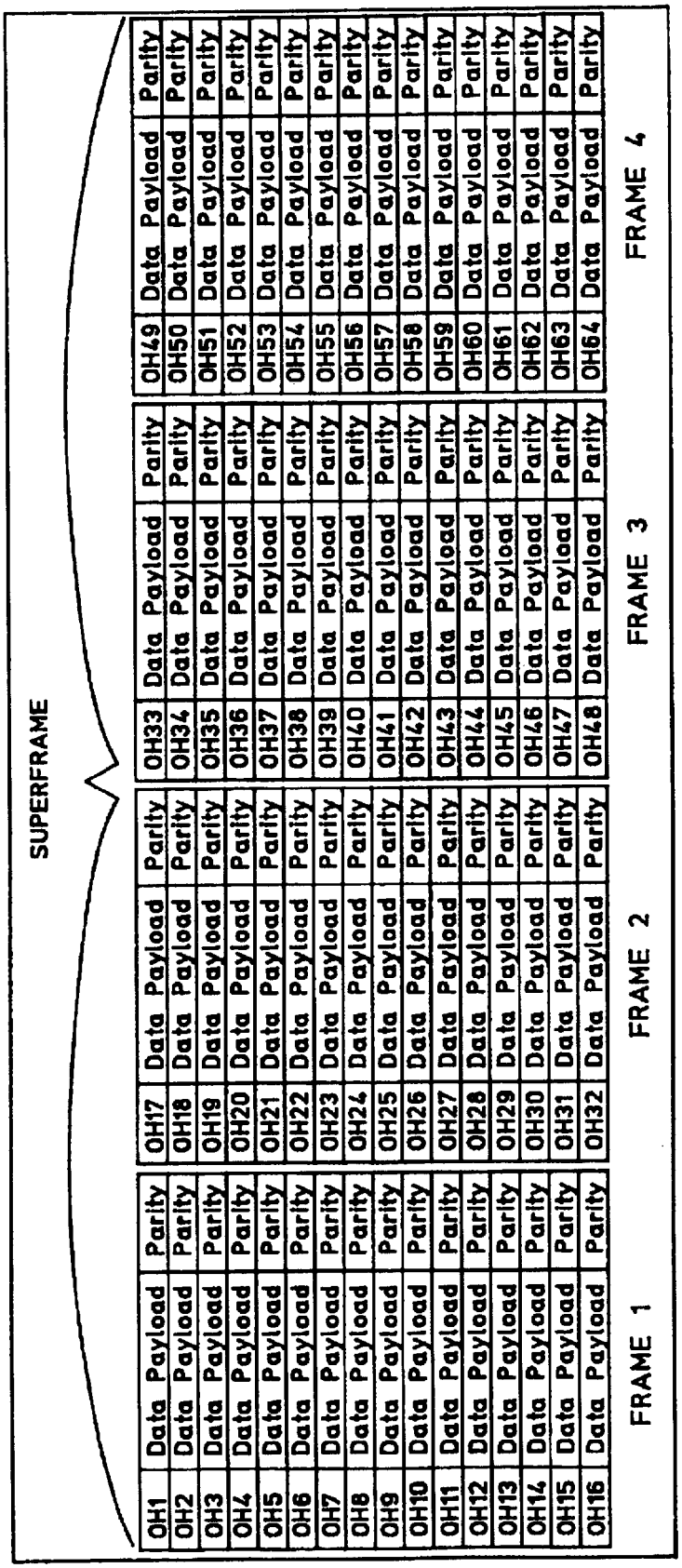
FIG. 2 is a diagram illustrating a multidimensional digital frame structure.

FIG. 2 is a diagram illustrating a multidimensional digital frame structure. As can be seen from examining Frame 1, each frame is considered to be multidimensional because it includes a plurality of rows, where each row includes an overhead byte, payload bytes, and parity (FEC) bytes. The present invention is not limited to any particular number of bytes to the overhead, payload, and FEC sections, or to any particular number of rows.

Returning to FIG. 1, the system 100 includes a receiver 120 with a frame receiver 122. The frame receiver 122 includes an overhead receiver 124 with an input on line 126 to accept commands for selecting the number of frame synchronization bytes for synchronizing the received frame. The overhead receiver 124 synchronizes the frame in response to recognizing the selected frame synchronization bytes. In other aspects of the invention, the frame synchronization function is performed by other elements of the receiver 120 (not shown). Once the FSBs have been identified, synchronization is possible. The frame can be decoded and the payload identified. In some aspects of the invention, the receiver 120 is part of a relay, and the payload is relayed as is, or modified before it is retransmitted. Commands to accept FSB bit error rates are accepted on line 128, commands to accept FSB locations are accepted on line 130, and commands to accept FSB values are accepted on line 134. Commands to accepts synchronization and non-synchronization information are accepted on lines 138 and 140, respectively.

As mentioned above, the overhead receiver 124 has an input to accept commands for programming the criteria necessary for loss of synchronization. That is, for selecting a number of missed frames required for losing synchronization. The frame receiver 122 then loses synchronization in response to the selected number of missed frames. Alternately stated, synchronization is lost when the number of frames missed by the frame receiver 122 equals the selected number of missed frames. Alternatively, the non-synchronization condition occurs when the number of missed frames exceeds the selected number. The frame receiver defines an overhead section with frame synchronization bytes. When the FSBs are recognized, the frame is not missed. When the FSBs are not recognized in the overhead section of a frame, the frame is missed. Thus, the overhead receiver 124 selects the number of missed frames by selecting a number of frames, with non-recognized frame synchronization bytes, required before the frame receiver 122 declares the communications to be out-of-sync.

The frame receiver 122 defines a superframe structure with a predetermined number of frames per superframe. In some aspects of the invention, synchronization is lost by missing a predetermined number of frames in the span of a superframe or multiframe, where a multiframe is a plurality of superframes. The overhead receiver 124 selects a number of missed frames in each superframe, and the frame receiver 122 falls out of synchronization in response to the selected number of missed frames in, each superframe. For example, the frame receiver 122 defines a first and a second frame in the superframe. Then, the overhead receiver 124 selects missed frames from the group including the first frame and the second frame. That is, the overhead receiver 124 looks for FSBs in the selected frames, and the frames are missed if FSBs are not recognized.

Of course, not all frames necessarily have FSBs. The first frame may have FSBs, while the second frame has none. In this context, the second frame cannot be "missed" because it has no FSBs to be recognized. In another example, however, a superframe may have FSBs in a first and third frame. Therefore, the first and third frames could be missed.

More typically, a loss of synchronization occurs over the span of several superframes. For example, the frame receiver 122 defines a first frame in a first superframe and a first frame in a second superframe. The overhead receiver 124 selects frames from the group including the first frame in the first superframe and the first frame in the second superframe. That is, the first frame in the first and second superframes includes FSBs to be recognized. More generally stated, the frame receiver 122 defines a first plurality of frames in each superframe, and the overhead receiver 124 selects frames from the first plurality of frames in each superframe.

Typically, the frame receiver 122 defines a second plurality of superframes. The overhead receiver 124 selects a number of consecutive superframes having frames with non-recognized frame synchronization bytes. That is, the overhead receiver 124 selects a first number of frames with non-recognized frame synchronization bytes in a second number of consecutive superframes. For example, the frame receiver 122 defines a superframe having four frames. The overhead receiver searches the first frame for recognized FSBs and selects four missed frames as the non-synch criteria. When the overhead receiver 124 then fails to recognize frame synchronization bytes in the first frame in four consecutive superframes, the frame receiver 122 falls out of synchronization.

As mentioned above, the concepts of missing and receiving frames is closely associated with recognizing FSBs in the selected frames. In some aspects of the invention, the overhead receiver 124 selects the value of frame synchronization bytes in the frame overhead section. Then, the frame receiver 122 falls out of synchronization in response to the overhead receiver 124 not recognizing the value of the frame synchronization bytes.

In some aspects of the invention, the overhead receiver 124 selects the number of frame synchronization bytes in the frame overhead section. The frame receiver 122 falls out of synchronization in response to the overhead receiver 124 not recognizing the selected number of frame synchronization bytes.

In some aspects, the overhead receiver 124 selects the bit error rate for the frame synchronization bytes. The frame receiver 122 falls out of synchronization in response to the overhead receiver 124 missing frames where the frame synchronization bytes bit error rate exceeds the selected bit error rate. The bit error rate can be selected for individual FSBs, however. Communications have a greater immunity to burst errors if the FSB bit error rate is averaged over a frame. Then, the frame is missed when the FSB bit error rate average exceeds the selected BER. In other aspects of the invention, the FSB BER is averaged over several frames, and the frames are not missed unless the BER in the several averaged frames exceeds the selected BER.

In some aspects of the invention, the overhead receiver 124 selects the location of the frame synchronization bytes in the frame overhead section. The frame receiver 122 falls out of synchronization in response to the overhead receiver 124 not recognizing selected frame synchronization bytes in the selected locations.

In some aspects of the invention, the frame receiver 122 defines a frame with an overhead section having a predetermined number of bytes. The overhead receiver 124 recognizes frame synchronization bytes in the frame overhead sections and selects a number of frames, with recognized frame synchronization bytes, required for synchronization. Then, the frame receiver 122 is synchronized with the received frames in response to the selected number of frames received with recognized frame synchronization bytes.

Returning to FIG. 2, it can be seen that a superframe includes a plurality of frames. Four frames are shown, but the present invention is not limited to any particular number of frames per superframe. Returning to FIG. 1, the frame generator 104 defines a superframe structure with a predetermined number of frames per superframe. Then, the overhead generator 106 selects frame synchronization byte values in the overhead section of each frame of the superframe. Likewise, the overhead receiver 124 recognizes frame synchronization bytes in each frame of the superframe. In some aspects of the invention, the overhead receiver 124 selects the number of frame synchronization bytes required for recognition, for each frame.

In some aspects of the invention, the frame generator 104 forms a superframe consisting of a first, second, third, and fourth frame, and the overhead generator 106 supplies a first frame synchronization byte value for the first frame, a second value for the second frame, a third byte value for the third frame, and a fourth byte value for the fourth frame. The first, second, third, and fourth byte values need not necessarily be different. Also, as explained below, each frame may include more than one FSB value. Typically, however, only the first frame includes FSB bytes, so that the overhead generator selects a second, third, and fourth number of byte values equal to zero. In the simple case, the frame receiver 122 forms a superframe consisting of a first, second, third, and fourth frame, and the overhead receiver 124 selects the first byte value for the first frame, the second byte value for the second frame, the third byte value for the third frame, and the fourth byte value for the fourth frame. Again, it is typical that the overhead receiver 124 selects a second, third, and fourth number of byte values equal to zero. Thus, only the first frame can be received or missed in the context of synchronization.

The overhead receiver 124 also selects the number of consecutive frames that must be recognized on line 138, and synchronizes the received superframe in response to the selected number of recognized frames. For example, the system may require that FSBs in two consecutive frames be identified, before a superframe is recognized. Likewise, the system may require that a plurality of consecutive superframes be recognized before synchronization occurs.

In some aspects of the invention, the overhead receiver 124 selects a quantity of bytes for each frame of the superframe, and recognizes the selected quantity (number) of frame synchronization bytes in each frame of the superframe. For example, the overhead receiver 124 selects a first number of byte values for a first frame of the superframe, and synchronizes the first frame by recognizing the first number of byte values in the first frame of the superframe.

In a simple aspect of the invention, the overhead generator 106 selects a first number of frame synchronization byte values in the overhead section of a frame, and the overhead receiver 124 selects the first number of frame synchronization byte values for recognition for the first frame. However, the overhead receiver need not select all the FSBs that have been supplied by the overhead generator 106. For example, when the overhead generator supplies a first number of frame synchronization byte values for a first frame, the overhead receiver 124 can select a second number of byte values, less than the first number, for the first frame. The overhead receiver synchronizes the received frame in response to recognizing the second number of frame synchronization byte values in the first frame.

Further, the overhead generator 106 can supply a first number of FSBs in a first frame and a second number of FSBs in the second frame. The overhead receiver 124 can synchronize using the first number of FSB values in the first frame and the second number of FSBs in the second frame. However, as explained above, the overhead receiver 124 need not recognize all the FSBs that are generated.

In some aspects of the invention the overhead receiver 124 has an input on line 128 to accept commands for selecting the bit error rate (BER) required for the recognition of a frame synchronization byte. For example, the overhead receiver 124 can select a number of permitted errors for each frame synchronization byte in the range from zero to a second plurality of errors, where each byte includes a second plurality of bits. Note that the BER can be set for different values in recognizing FSBs in a single frame. Likewise, the BER can be set for different values between frames, or between superframes. The BER can be made to correspond to the FSB location and/or the FSB value. However, as mentioned above, the average BER in a frame is often most useful. Then, the overhead receiver 124 receives a frame when the average frame synchronization byte BER is less than, or equal to, the selected frame synchronization bit error rate.

In some aspects of the invention, the overhead receiver 124 accepts commands for selecting the location of the bytes on line 130 to be used for the frame synchronization of received frames. The overhead receiver 124 synchronizes the received frame in response to recognizing frame synchronization bytes in the selected locations. The frame locations can vary between frames, and between superframes. For example, the overhead receiver 124 selects a first number of FSB byte values in a first number of frames and a second number of FSB byte values in a second number of locations. Likewise, a first number of location can be selected in a first frame of the superframe, and a second number of locations in a second frame. The overhead receiver 124 synchronizes the received frame in response to recognizing frame synchronization bytes in the first number of selected locations in the first frame and the second number of selected locations in the second frame. Looking a FIG. 2 momentarily to refine the above-mentioned example, locations OH 1, OH 2, and OH 3 can be selected for the first frame, while locations OH 5, OH 6, and OH 7 can be selected for the second frame. This example would, of course, require the overhead generator 106 to supply FSBs in at least the above-mentioned byte locations. Likewise, the frame would be missed if FSBs are not recognized in the above-mentioned byte locations In a simple aspect of the invention, the overhead generator 106 selects a first number of locations for a first number of frame synchronization bytes, in response to commands on line 132, and the overhead receiver 124 selects the first number of locations for the first number of frame synchronization bytes. However, the overhead receiver need not select all the location provided by the overhead generator 106. For example, the overhead generator 106 selects a first number of locations for a first number of frame synchronization bytes, and the overhead receiver 124 selects a second number of locations for a second number of frame synchronization bytes, less than the first number, and synchronizes the received frame in response to recognizing frame synchronization bytes in the second number of selected locations. Momentarily examining FIG. 2, the overhead generator 106 may supply FSBs in locations OH 1 through OH 6, while the overhead receiver selects locations OH 4 through OH 6 for use.

In some aspects of the invention, the overhead receiver accepts commands for selecting the values of each frame synchronization byte on line 134. The overhead receiver 124 synchronizes the received frame in response to recognizing the values of synchronization bytes. Typically, the FSB word is a byte of eight bits, although the invention is not limited to an FSB word of any particular length. With eight bit values, $2^8$ possible FSB values are possible for every FSB. Likewise, the FSB values may vary inside a frame. If a frame includes a first plurality, i.e., sixteen, overhead bytes, and sixteen FSBs are selected, then each of the sixteen FSBs may be the same byte value. On the other extreme, each FSB byte value may be different, and sixteen FSB values can be used in the frame. Thus, each frame can be synchronized using FSBs having different values. Likewise, a frame can be missed if the selected FSB values are not recognized.

In one aspect of the invention, the overhead receiver 124 selects first frame synchronization bytes having a first value and second frame synchronization bytes having a second value. Then, the overhead receiver 124 synchronizes the received frame in response to recognizing the first frame synchronization bytes having the first value and the second frame synchronization bytes having the second value. Although an example using two different FSB values is presented above, it is possible to have as many FSBs as there are rows in a frame. Thus, in the frame structure of FIG. 3, each frame could have a first plurality (sixteen in the example of FIG. 2) unique FSB values. Even more FSB values could be used if a greater portion of each row was devoted to the overhead section, at the expense of the payload or FEC sections.

Likewise, the value of the FSBs can change between frames. In some aspects of the invention, the overhead receiver 124 selects a first number of frame synchronization bytes having a first value in a first frame and a second number of frame synchronization bytes having a second value in a second frame. The overhead receiver synchronizes the received frame in response to recognizing the first number of frame synchronization bytes having the first value in the first frame and the second number of frame synchronization bytes having the second value in the second frame.

Alternately, multiple FSB values can be used in multiple frames. For example, the overhead receiver 124 selects a first number of frame synchronization bytes having a first value and a second number of frame synchronization bytes having a second value in a first and second frame. Then, the overhead receiver 124 synchronizes the frame in response to recognizing frame synchronization bytes having the first and second values in the first, and second frames. In some aspects of the invention, the first FSB values are located in a first frame, and the second FSB values are located in a second frame.

Figure 3:
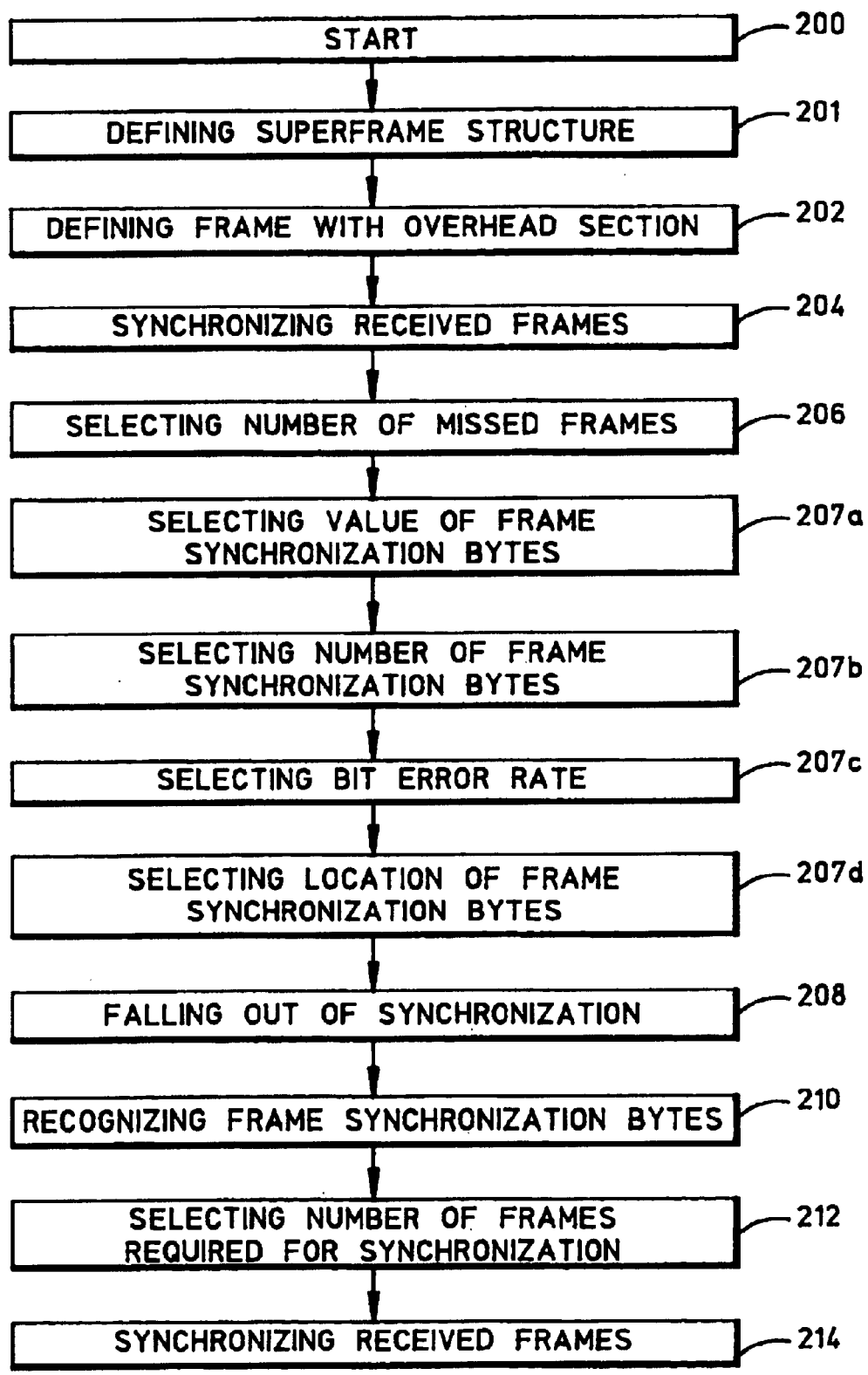
FIG. 3 is a flowchart depicting a method for variably programming synchronization loss criteria in a multidimensional digital frame structure.

FIG. 3 is a flowchart depicting a method for variably programming synchronization loss criteria in a multidimensional digital frame structure. Although the method is depicted as a sequence of numbered steps for clarity, no order should be inferred from the numbering unless explicitly stated. The method begins at Step 200. Step 202 defines a frame with an overhead section having a predetermined number of bytes. Step 204 synchronizes received frames. Step 206 selects a number of missed frames required for losing synchronization. Step 208 falls out of synchronization in response to the selected number of missed frames.

In some aspects of the invention, defining a frame with an overhead section in Step 202 includes defining an overhead section with frame synchronization bytes. Selecting a number of missed frames required for losing synchronization in Step 206 includes selecting a number of frames with non-recognized frame synchronization bytes.

Step 201 defines a superframe structure with a predetermined number of frames per superframe. Selecting a number of missed frames in Step 206 includes selecting a number of missed frames in each superframe. Falling out of synchronization in response to the selected number of missed frames in Step 208 includes falling out of synchronization in response to the selected number of missed frames in each superframe.

In some aspects of the invention, defining a superframe structure with a predetermined number of frames per superframe in Step 201 includes defining a first and a second frame in the superframe. Selecting a number of missed frames in Step 206 includes selecting missed frames from the group including the first frame and the second frame.

In some aspects of the invention, defining a superframe structure with a predetermined number of frames per superframe in Step 201 includes defining a first frame in a first superframe and a first frame in a second superframe. Selecting a number of missed frames in Step 206 includes selecting frames from the group including the first frame in the first superframe and the first frame in the second superframe.

In some aspects of the invention, defining a superframe structure with a predetermined number of frames per superframe in Step 201 includes defining a first plurality of frames in each superframe. Selecting a number of missed frames in Step 206 includes selecting frames from the first plurality of frames in each superframe.

In some aspects of the invention, defining a superframe structure with a predetermined number of frames per superframe in Step 201 includes defining a plurality of superframes. Selecting a number of missed frames in Step 206 includes selecting a number of consecutive superframes having frames with non-recognized frame synchronization bytes.

In some aspects of the invention, selecting a number of missed frames in Step 206 includes selecting a first number of frames with non-recognized frame synchronization bytes in a second number of consecutive superframes.

In some aspects of the invention, defining a superframe structure with a predetermined number of frames per superframe in Step 201 includes defining a superframe having four frames. Selecting a number of missed frames in Step 206 includes not recognizing frame synchronization bytes in the first frame in four consecutive superframes.

Step 207a selects the value of frame synchronization bytes in the frame overhead section. Falling out of synchronization in response to the selected number of missed frames in Step 208 includes falling out of synchronization in response to not recognizing the value of the frame synchronization bytes in the missed frames.

In some aspects of the invention, defining a frame in Step 202 includes defining each frame synchronization byte having a second plurality of bits. Selecting the value of the frame synchronization bytes in Step 207a includes selecting a second plurality of bits for each frame synchronization byte.

Step 207b selects the quantity of frame synchronization bytes in the frame overhead section. Falling out of synchronization in response to the selected number of missed frames in Step 208 includes falling out of synchronization in response to not recognizing the selected quantity of frame synchronization bytes in the missed frames.

Step 207c selects the bit error rate for the frame synchronization bytes. Falling out of synchronization in response to the selected number of missed frames in Step 208 includes falling out of synchronization in response to not recognizing the frame synchronization bytes having a bit error rate greater than the selected bit error rate in the missed frames.

In some aspects, selecting a frame synchronization byte bit error rate in Step 207c includes selecting an average BER for each frame. Then, Step 208 falls out of synchronization in response to the missing frames having an average BER that is greater than the selected BER for that frame. In some aspects of the invention, a byte is made programmable to select the average BER for each frame, in the range from zero to a second plurality of errors, where each frame synchronization byte includes a second plurality of bits.

Step 207d selects the location of the frame synchronization bytes in the frame overhead section. Falling out of synchronization in response to the selected number of missed frames in Step 208 includes falling out of synchronization in response to not recognizing the frame synchronization bytes in the selected locations in the missed frame.

Some aspects of the invention include further steps. Step 210 recognizes frame synchronization bytes in the frame overhead sections. Step 212 selects a number of frames, with recognized frame synchronization bytes, required for synchronization. Step 214 synchronizes received frames in response to the selected number of frames received with recognized frame synchronization bytes.

Figure 4:
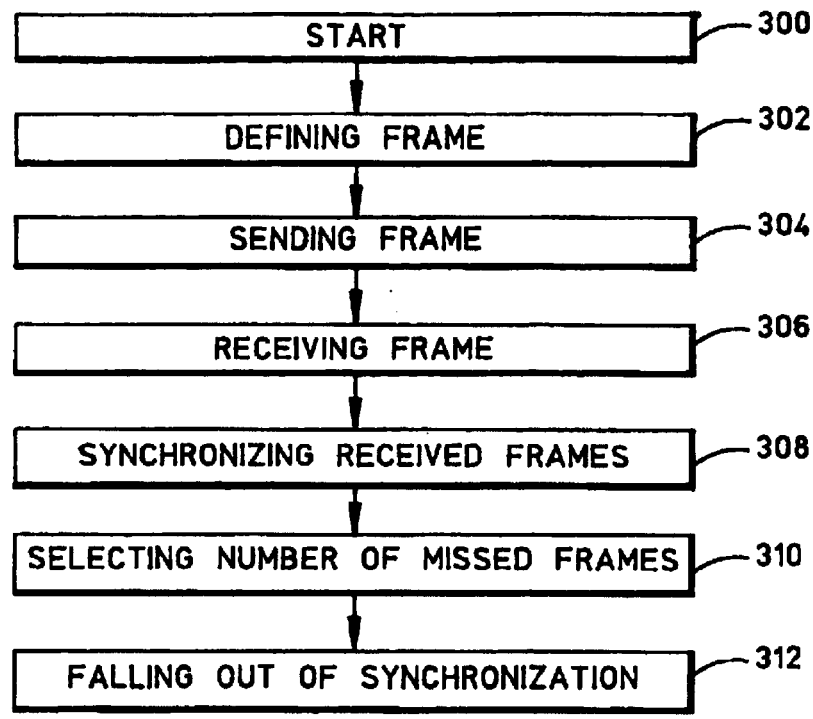
FIG. 4 is a flowchart depicting a method for variably programming synchronization loss criteria in the communication of a multidimensional digital frame structure.

FIG. 4 is a flowchart depicting a method for variably programming synchronization loss criteria in the communication of a multidimensional digital frame structure. The method begins with Step 300. Step 302 defines a frame with an overhead section having a predetermined number of bytes. Step 304 sends a frame. Step 306 receives the frame. Step 308 synchronizes received frames. Step 310 selects a number of missed frames required for losing synchronization. Step 312 falls out of synchronization in response to the selected number of missed frames.

An example of the above, broadly-stated invention is presented below. The typical frame structure uses a 255-byte FEC code as the basic building block which is referred to as a subframe, or row. Each subframe is defined by a Reed-Solomon (RS) codec that is intended to provide 8 byte correction capability over the 255-byte block. This codec is referred to as RS(255,239) for 8 byte correction.

Figure 5:
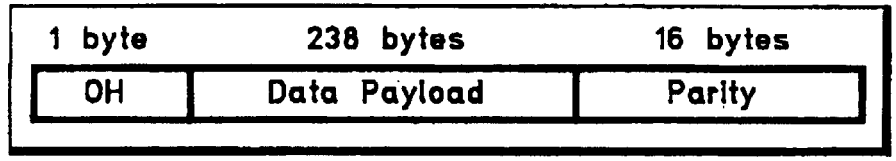
FIG. 5 is an example of a subframe consisting of a 255-byte RS(255,239) block with an overhead (OH) byte as the first byte, followed by 238 user payload bytes, and 16 bytes of RS parity.

FIG. 5 is an example of a subframe consisting of a 255-byte RS(255,239) block with an overhead (OH) byte as the first byte, followed by 238 user payload bytes, and 16 bytes of RS parity. The OH byte may be used as a Frame Synchronization Byte (FSB) or other programmable function.

Figure 6:
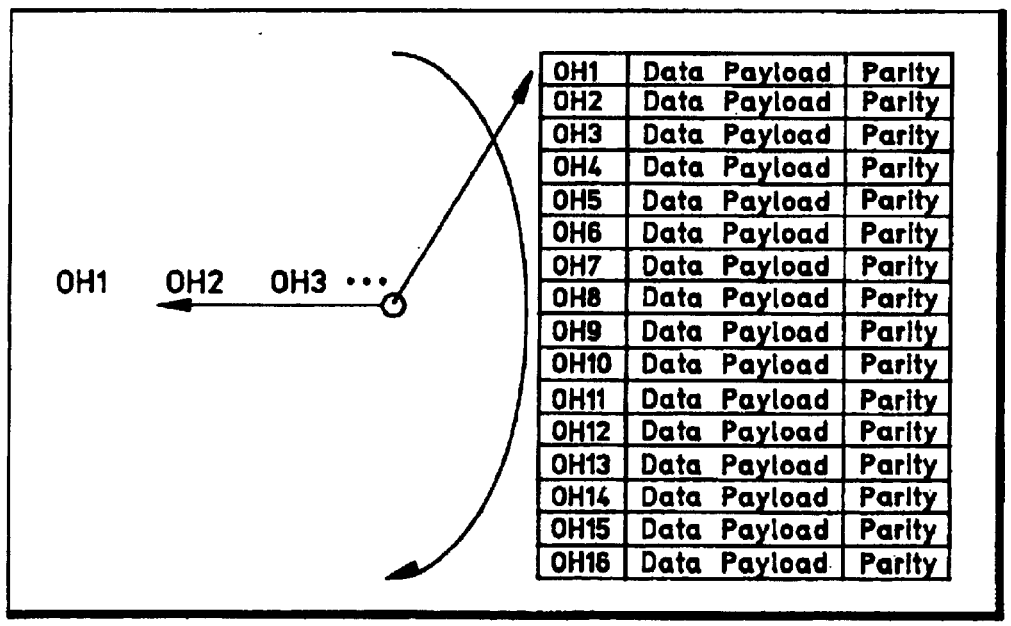
FIG. 6 illustrates the stacking of subframes in a frame.

FIG. 6 illustrates the stacking of subframes in a frame. The subframes are stacked in a structure that is 16 deep to create a frame as shown in FIG. 2. The bytes are transmitted in an interleaved fashion from top to bottom and left to right. Four frames are used to create a superframe as shown in FIG. 2. A superframe contains 64 overhead locations. The frames are transmitted in order from frame 1 to frame 4.

The first frame in the superframe is the one that traditionally contains frame synchronization bytes. The user may select to have two different FSB types (FSB1 and FSB2). The ability to have two different FSBs and the ability to program them with custom values provide the user added control over their system both in terms of resistance to false synchronization and the ability to distinguish different data sources from each other. This is useful when there are multiple wavelengths that can be received, all carrying the same frame structure, but only one of which is allowed/permissioned to be received at a particular node. Table 1 provides an example of how the FSB types are defined.

TABLE 1

Frame Synchronization Byte Definitions

| Bit     | 15 | 14 | 13 | 12 | 11 | 10 | 9  | 8  | 7  | 6  | 5  | 4  | 3  | 2  | 1  | 0  |
|---------|----|----|----|----|----|----|----|----|----|----|----|----|----|----|----|----|
| Name    |    |    |    | FSB 2 | | | | | | | | FSB 1 | | | | |
| Mode    | rw | rw | rw | rw | rw | rw | rw | rw | rw | rw | rw | rw | rw | rw | rw | rw |
| Default | 0  | 0  | 1  | 0  | 1  | 0  | 0  | 0  | 0  | 1  | 1  | 1  | 1  | 0  | 1  | 1  | 0 |

| Bit Positions | Function | Description |
|---|---|---|
| 15:8 | FSB 2 | Frame Synchronization Byte 2 (Default value = 28 h) |
| 7:0  | FSB 1 | Frame Synchronization Byte 1 (Default value = F6 h) |

Accommodations are made for two separate frame synchronization bytes.

The FSBs are also programmable in number. In Frame 1, OH 1 to OH 16 can be programmed to be FSB1, FSB2, or a non-FSB function. This expands on the variability afforded by having two different FSBs. By using more of the available bandwidth for FSBs, the user decreases the chance of false synchronization and in general, decreases the amount of time required to acquire synchronization. The user can customize this parameter to optimize for specific requirements and link conditions.

Table 2 demonstrates the structure required to indicate which OH bytes are used for FSBs and Table 3 illustrates the structure that sets whether to use FSB1 or FSB2. The FSB programmability exists independently in both the transmit and receive portions of the device. In the receive section of the device, the number of recognized consecutive FSB groups required to declare synchronization is programmable, as well as the number of bad consecutive FSB groups required to lose synchronization. This is the first level of thresholding for adjusting the tolerance to bit error rate and the amount of time required to declare synchronization. Table 4 is an example of synchronization parameter setting. The fewer consecutive FSB groups required to achieve synchronization, the shorter the acquisition time. The more consecutive bad FSB groups required to lose synchronization, the greater the system tolerant of higher bit error rates.

The second level of thresholding is to define what is considered a good group of FSBs vs. a bad group of FSBs. This is done by specifying the number of errors that are allowed within a group of FSBs and still be considered good as shown in Table 4. This feature has the advantage of decreasing synchronization time in the presence of high bit error rates. Longer FSB groups are permitted which decrease the probability of false synchronization, without incurring the penalty of difficult synchronization in the presence of noise. Further, the FEC code is given greater opportunity to correct errors.

Another benefit of the second level of thresholding is the ability to dynamically customize the values of the FSBs. This thresholding provides network security, and dynamically allocates more bytes for synchronization based on the link conditions, without causing a resynchronization to occur.

TABLE 2

Frame Synchronization Byte Locations Register

| Bit     | 15  | 14  | 13  | 12  | 11  | 10  | 9   | 8   | 7   | 6    | 5    | 4    | 3    | 2    | 1    | 0    |
|---------|-----|-----|-----|-----|-----|-----|-----|-----|-----|------|------|------|------|------|------|------|
| Name    | OH#1| OH#2| OH#3| OH#4| OH#5| OH#6| OH#7| OH#8| OH#9| OH#10| OH#11| OH#12| OH#13| OH#14| OH#15| OH#16|
| Mode    | rw  | rw  | rw  | rw  | rw  | rw  | rw  | rw  | rw  | rw   | rw   | rw   | rw   | rw   | rw   | rw   |
| Default | 1   | 1   | 1   | 1   | 1   | 1   | 0   | 0   | 0   | 0    | 0    | 0    | 0    | 0    | 0    | 0    |

| Bit Positions | Function | Description |
|---|---|---|
| 15 | OH#1 | 0: Not a Frame Synchronization Byte<br>1: Frame Synchronization Byte (FSB) (Default) |
| 14 | OH#2 | 0: Not a Frame Synchronization Byte<br>1: Frame Synchronization Byte (FSB) (Default) |
| 13 | OH#3 | 0: Not a Frame Synchronization Byte<br>1: Frame Synchronization Byte (FSB) (Default) |
| 12 | OH#4 | 0: Not a Frame Synchronization Byte<br>1: Frame Synchronization Byte (FSB) (Default) |
| 11 | OH#5 | 0: Not a Frame Synchronization Byte<br>1: Frame Synchronization Byte (FSB) (Default) |
| 10 | OH#6 | 0: Not a Frame Synchronization Byte<br>1: Frame Synchronization Byte (FSB) (Default) |
| 9  | OH#7 | 0: Not a Frame Synchronization Byte (Default)<br>1: Frame Synchronization Byte (FSB) |
| 8  | OH#8 | 0: Not a Frame Synchronization Byte (Default)<br>1: Frame Synchronization Byte (FSB) |
| 7  | OH#9 | 0: Not a Frame Synchronization Byte (Default)<br>1: Frame Synchronization Byte (FSB) |

TABLE 2-continued

Frame Synchronization Byte Locations Register

| | | |
|---|---|---|
| 6 | OH#10 | 0: Not a Frame Synchronization Byte (Default) |
| | | 1: Frame Synchronization Byte (FSB) |
| 5 | OH#11 | 0: Not a Frame Synchronization Byte (Default) |
| | | 1: Frame Synchronization Byte (FSB) |
| 4 | OH#12 | 0: Not a Frame Synchronization Byte (Default) |
| | | 1: Frame Synchronization Byte (FSB) |
| 3 | OH#13 | 0: Not a Frame Synchronization Byte (Default) |
| | | 1: Frame Synchronization Byte (FSB) |
| 2 | OH#14 | 0: Not a Frame Synchronization Byte (Default) |
| | | 1: Frame Synchronization Byte (FSB) |
| 1 | OH#15 | 0: Not a Frame Synchronization Byte (Default) |
| | | 1: Frame Synchronization Byte (FSB) |
| 0 | OH#16 | 0: Not a Frame Synchronization Byte (Default) |
| | | 1: Frame Synchronization Byte (FSB) |

This table defines which of the overhead bytes (1–16) are going to be used as FSBs.

TABLE 3

Frame Synchronization Byte Types

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | OH#1 | OH#2 | OH#3 | OH#4 | OH#5 | OH#6 | OH#7 | OH#8 | OH#9 | OH#10 | OH#11 | OH#12 | OH#13 | OH#14 | OH#15 | OH#16 |
| Mode | rw | rw | rw | rw | rw | rw | rw | rw | rw | rw | rw | rw | rw | rw | rw | rw |
| Default | 0 | 0 | 0 | 1 | 1 | 1 | 0 | 0 | 0 | 0 | 0 | 0 | 0 | 0 | 0 | 0 |

| Bit Positions | Function | Description |
|---|---|---|
| 15 | OH#1 | 0: FSB 1 (Default) |
| | | 1: FSB 2 |
| 14 | OH#2 | 0: FSB 1 (Default) |
| | | 1: FSB 2 |
| 13 | OH#3 | 0: FSB 1 (Default) |
| | | 1: FSB 2 |
| 12 | OH#4 | 0: FSB 1 |
| | | 1: FSB 2 (Default) |
| 11 | OH#5 | 0: FSB 1 |
| | | 1: FSB 2 (Default) |
| 10 | OH#6 | 0: FSB 1 |
| | | 1: FSB 2 (Default) |
| 9 | OH#7 | 0: FSB 1 (Default) |
| | | 1: FSB 2 |
| 8 | OH#8 | 0: FSB 1 (Default) |
| | | 1: FSB 2 |
| 7 | OH#9 | 0: FSB 1 (Default) |
| | | 1: FSB 2 |
| 6 | OH#10 | 0: FSB 1 (Default) |
| | | 1: FSB 2 |
| 5 | OH#11 | 0: FSB 1 (Default) |
| | | 1: FSB 2 |
| 4 | OH#12 | 0: FSB 1 (Default) |
| | | 1: FSB 2 |
| 3 | OH#13 | 0: FSB 1 (Default) |
| | | 1: FSB 2 |
| 2 | OH#14 | 0: FSB 1 (Default) |
| | | 1: FSB 2 |
| 1 | OH#15 | 0: FSB 1 (Default) |
| | | 1: FSB 2 |
| 0 | OH#16 | 0: FSB 1 (Default) |
| | | 1: FSB 2 |

NOTE: If an OH byte is not defined to be an FSB in the Decoder Frame Synchronization Byte Locations Register, the corresponding bit in this register has no significance.

Table 4

Decoder Framing Controls

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Check to go In-Frame | | | | Check to go Out-of-Frame | | | | Unused | | FSB Errors Allowed | | | | | |
| Mode | rw | rw | rw | rw | rw | rw | rw | rw | ro | ro | rw | rw | rw | rw | rw | rw |
| Default | 0 | 0 | 1 | 0 | 0 | 1 | 0 | 0 | 0 | 0 | 0 | 0 | 1 | 0 | 0 | 0 |

| Bit Positions | Function | Description |
|---|---|---|
| 15:12 | Check to go In-Frame | Number of correct consecutive FSB groups required to go In-Frame. (Default value = 2) |
| 11:8 | Check to go Out-of-Frame Frame | Number of incorrect consecutive FSB groups required to go Out-of-Frame. (Default value = 4) |
| 7:5 | Unused | |
| 5:0 | FSB Errors Allowed | The total number of erred bits allowed in a group of FSBs to still consider a match. (Default value = 8). This number is used regardless of the synchronization state (In-Frame or Out-of-Frame). |

Table 4 sets the synchronization thresholding parameters.

A system and method have been provided that illustrate the advantages of providing programmable loss of synchronization criteria. The invention can customize the synchronization methodology, to optimize robustness to noise and synchronization time. The invention specifically illustrates an example using programmable numbers of FSBs, programmable gain synchronization, programmable lose synchronization parameters, and programmable bit error tolerance within the FSBs themselves. However, the invention is not limited to an particular synch criteria, or any specific framing structure. The invention permits users to create different networks that are logically separated from each other so that receivers can easily distinguish between different data sources. Other variations and embodiments of the invention will occur to those skilled in the art.

We claim:

1. A method for variably programming synchronization loss criteria in a multidimensional digital frame structure, the method comprising:

defining a frame with an overhead section having a predetermined number of bytes;

synchronizing received frames;

selecting a number of missed frames required for losing synchronization; and falling out of synchronization in response to the selected number of missed frames.

2. The method of claim 1 wherein defining a frame with an overhead section includes defining an overhead section with frame synchronization bytes; and wherein selecting a number of missed frames required for losing synchronization includes selecting a number of frames with non-recognized frame synchronization bytes.

3. The method of claim 2 further comprising:

defining a superframe structure with a predetermined number of frames per superframe; and wherein selecting a number of missed frames includes selecting a number of missed frames in each superframe; and wherein falling out of synchronization in response to the selected number of missed frames includes falling out of synchronization in response to the selected number of missed frames in each superframe.

4. The method of claim 2 wherein defining a superframe structure with a predetermined number of frames per superframe includes defining a first and a second frame in the superframe; and wherein selecting a number of missed frames includes selecting missed frames from the group including the first frame and the second frame.

5. The method of claim 3 wherein defining a superframe structure with a predetermined number of frames per superframe includes defining a first frame in a first superframe and a first frame in a second superframe; and wherein selecting a number of missed frames includes selecting frames from the group including the first frame in the first superframe and the first frame in the second superframe.

6. The method of claim 5 wherein defining a superframe structure with a predetermined number of frames per superframe includes defining a first plurality of frames in each superframe; and wherein selecting a number of missed frames includes selecting frames from the first plurality of frames in each superframe.

7. The method of claim 6 wherein defining a superframe structure with a predetermined number of frames per superframe includes defining a second plurality of superframes; and wherein selecting a number of missed frames includes selecting a number of consecutive superframes having frames with non-recognized frame synchronization bytes.

8. The method of claim 7 wherein selecting a number of missed frames includes selecting a first number frames with non-recognized frame synchronization bytes in a second number of consecutive superframes.

9. The method of claim 8 wherein defining a superframe structure with a predetermined number of frames per superframe includes defining a superframe having four frames; and wherein selecting a number of missed frames includes not recognizing frame synchronization bytes in the first frame in four consecutive superframes.

10. The method of claim 2 further comprising:

selecting the value of frame synchronization bytes in the frame overhead section.

11. The method of claim 10 wherein falling out of synchronization in response to the selected number of missed frames includes falling out of synchronization in response to not recognizing the value of the frame synchronization bytes in the missed frames.

12. The method of claim 10 wherein defining a frame includes defining each frame synchronization byte having a second plurality of bits; and wherein selecting the value of the frame synchronization bytes includes selecting a second plurality of bits for each frame synchronization byte.

13. The method of claim 2 further comprising:

selecting the quality of frame synchronization bytes in the frame overhead section.

14. The method of claim 13 wherein falling out of synchronization in response to the selected number of missed frames includes falling out of synchronization in response to not recognizing the selected quantity of frame synchronization bytes in the missed frames.

15. The method of claim 2 further comprising:

selecting the bit error rate for the frame synchronization bytes.

16. The method of claim 15 wherein falling out of synchronization in response to the selected number of missed frames includes falling out of synchronization in response to not recognizing the frame synchronization bytes having a bit error rate greater than the selected bit error rate.

17. The method of claim 15 wherein selecting a frame synchronization byte bit error rate includes selecting an average frame synchronization byte bit error rate for each frame.

18. The method of claim 2 further comprising:

selecting the location of the frame synchronization bytes in the frame overhead section.

19. The method of claim 18 wherein falling out of synchronization in response to the selected number of missed frames includes falling out of synchronization in response to not recognizing frame synchronization bytes in the selected locations of the missed frames.

20. The method of claim 2 further comprising:

recognizing frame synchronization bytes in the frame overhead sections;

selecting a number of frames, with recognized frame synchronization bytes, required for synchronization; and synchronizing received frames in response to the selected number of frames received with recognized frame synchronization bytes.

21. A method for variably programming synchronization loss criteria of received frames in the communication of a multidimensional digital frame structure, the method comprising:

defining a frame with an overhead section having a predetermined number of bytes;

sending a frame;

receiving the frame;

synchronizing received frames;

selecting a number of missed frames required for losing synchronization; and falling out of synchronization in response to the selected number of missed frames.

22. A receiver system for variably programming synchronization loss criteria in a multidimensional digital frame structure, the system comprising:

a frame receiver including an overhead receiver to process the overhead section of a frame, a payload generator to process the payload section of the frame, and a decoder to provide forward error correction (FEC) for the frame;

wherein the overhead receiver has an input to accept commands for selecting a number of missed frames required for losing synchronization; and wherein the frame receiver loses synchronization in response to the selected number of missed frames.

23. The system of claim 22 wherein the frame receiver defines an overhead section with frame synchronization bytes; and wherein the overhead receiver misses a frame in response to not recognizing frame synchronization bytes.

24. The system of claim 23 wherein the frame receiver defines a superframe structure with a predetermined number of frames per superframe; and wherein the overhead receiver selects a number of missed frames in each superframe; and wherein the frame receiver falls out of synchronization in response to the selected number of missed frames in each superframe.

25. The system of claim 23 wherein the frame receiver defines a first and a second frame in the superframe; and wherein the overhead receiver selects missed frames from the group including the first frame and the second frame.

26. The system of claim 24 wherein the frame receiver defines a first frame in a first superframe and a first frame in a second superframe; and wherein the overhead receiver selects frames from the group including the first frame in the first superframe and the first frame in the second superframe.

27. The system of claim 26 wherein the frame receiver defines a first plurality of frames in each superframe; and wherein the overhead receiver selects frames from the first plurality of frames in each superframe.

28. The system of claim 27 wherein the overhead receiver selects a number of consecutive superframes having frames with non-recognized frame synchronization bytes.

29. The system of claim 28 wherein the overhead receiver selects a first number of frames with non-recognized frame synchronization bytes in a second number of consecutive superframes.

30. The system of claim 29 wherein the frame receiver defines a superframe having four frames;

wherein the overhead receiver fails to recognize frame synchronization bytes in the first frame of four consecutive superframes; and wherein the frame receiver loses synchronization in response to missing the first frame in four consecutive superframes.

31. The system of claim 23 wherein the overhead receiver selects the value of frame synchronization bytes in the frame overhead section.

32. The system of claim 31 wherein the frame receiver falls out of synchronization in response to the overhead receiver not recognizing the value of the frame synchronization bytes.

33. The system of claim 31 wherein the frame receiver defines each frame synchronization byte having a second plurality of bits; and wherein the overhead receiver selects a second plurality of bits for each frame synchronization byte.

34. The system of claim 23 wherein the overhead receiver selects the number of frame synchronization bytes in the frame overhead section.

35. The system of claim 34 wherein the frame receiver falls out of synchronization in response to the overhead receiver not recognizing the selected number of frame synchronization bytes.

36. The system of claim 23 wherein the overhead receiver selects the bit error rate for the frame synchronization bytes.

37. The system of claim 36 wherein the frame receiver falls out of synchronization in response missing frames where the frame synchronization byte bit error rate exceeds the selected bit error rate.

38. The system of claim 36 wherein the frame receiver falls out of synchronization in response to missing frames where the average of the frame synchronization byte bit error rate exceeds the selected bit error rate.

39. The system of claim 23 wherein the overhead receiver selects the location of the frame synchronization bytes in the frame overhead section.

40. The system of claim 39 wherein the frame receiver falls out of synchronization in response to the overhead receiver not recognizing frame synchronization bytes in the selected locations.

41. The system of claim 23 wherein the frame receiver defines a frame with an overhead section having a predetermined number of bytes;

wherein the overhead receiver recognizes frame synchronization bytes in the frame overhead sections and selects a number of frames with recognized frame synchronization bytes required for synchronization; and wherein the frame receiver is synchronized with the received frames in response to the selected number of frames received with recognized frame synchronization bytes.

42. A system for variably programming the synchronization of a multidimensional digital frame structure, the system comprising:

a frame generator including an overhead generator to generate the overhead section of a frame, a payload generator to generate the payload section of the frame, and an encoder to provide forward error correction (FEC) for the frame;

a frame receiver including an overhead receiver to process the overhead section of a frame, a payload generator to process the payload section of the frame, and a decoder to provide forward error correction (FEC) for the frame;

wherein the overhead receiver has an input to accept commands for selecting a number of missed frames required for losing synchronization; and wherein the frame receiver loses synchronization in response to the selected number of missed frames.

* * * * *